United States Patent Office 3,555,155
Patented Jan. 12, 1971

3,555,155
METHOD OF CONTROLLING INSECTS
Barbara Stearns, Highland Park, N.J., assignor to E. R. Squibb & Sons, Inc., New York, N.Y., a corporation of Delaware
No Drawing. Filed June 3, 1968, Ser. No. 733,812
Int. Cl. A01n 9/12, 9/22
U.S. Cl. 424—246                                                4 Claims

ABSTRACT OF THE DISCLOSURE

Insects are controlled by contacting the insect with insecticidal amounts of 4-(2-diethylaminoethyl)-2-(paramethoxyphenyl)-2H-1,4-benzothiazin-3(4H)-one, and salts thereof.

---

This invention relates to compositions and methods for the control of insects, particularly the common housefly.

It has been discovered that the compound, 4-(2-diethylaminoethyl) - 2 - (paramethoxyphenyl) - 2H - 1,4 - benzothiazin-3(4H)-one, and salts thereof, is particularly effective as a contact insecticide against various insects, but particularly against the common housefly and the Mexican bean beetle. The compounds of this invention may be applied directly to the insect, or alternatively, may be applied to areas or plants frequented by the insect in any of a variety of formulations.

Preferably, the compound is extended with carriers or conditioning agents of the kind used and commonly referred to in the art as adjuvants or modifiers. Such adjuvants are inert solids, surface-active agents and organic liquids.

The compound of this invention is incorporated in such compositions in sufficient amount to exert an insecticidal effect. Usually from about 1 to 95 percent by weight of the compound is included in such formulations.

Solid formulations are prepared with inert powders. The formulations thus prepared are used as such, diluted further with inert solids to form dusts, or suspended in a suitable liquid medium for spray application.

The powders usually comprise the active ingredient admixed with minor amounts of conditioning agents. Neutral clays, for example, the absorptive attapulgite or the relatively nonabsorptive china clays, diatomaceous earth, walnut shell flour, redwood flour, synthetic fine silica, calcium silicate and other inert solid carriers of the kind conventionally employed in powder formulations are used.

The active ingredient is suitably about 1 to 95 percent by weight of the compositions. The solids preferably are finely divided and have a particle size below about 50 microns or, better, below about 20 microns. Dust formulations are prepared using talc, pyrophyllite, tobacco dust, volcanic ash or other dense, inert solids as diluents.

Liquid compositions are prepared by mixing the active compounds with suitable liquid diluent media. The active compound is either in solution or in suspension in the liquid medium. Suitable liquid media include kerosene, Stoddard solvent, xylene, alcohols, alkylated naphthalenes, diesel oil, glycols and ketones, for example, diisobutyl ketone and cyclohexanone. The active ingredient is preferably from about 0.5 to 50 percent of these liquid compositions. These compositions are used as such or extended by emulsification with water.

Insecticidal wettable powders or liquids suitably include one or more surface-active agents, for example, wetting, dispersing, or emulsifying agents. Compositions containing these surface-active agents disperse or emulsify easily in water to form aqueous sprays. The compositions suitably contain up to 10 percent by weight of the surface-active agents but some surface-active agents are effective at less than 1 percent.

Surface-active agents are suitably of the anionic, cationic, or nonionic type. Examples include sodium oleate, sulfonated petroleum oils, alkyl aryl sulfonates, sodium lauryl sulfate, polyethylene oxides, lignin sulfonates, and other surface-active agents. Additional suitable agents are described by McCutcheon in Soap and Chemical Specialties, volume 31, Nos. 7–10 (1955).

Insecticidal compositions are applied to the foliage or plants, soil, or other locations infested by insects, or, alternatively, directly sprayed onto the insects. The rate of application is sufficient to exert the desired insecticidal action. Dosage depends on the components of the formulation, method of application, type and quantity of insects, duration of treatment, climatic conditions and lesser factors. Obviously, where direct application to the insect is feasible, lower concentrations may be employed. In such an instance concentrations as low as 0.005 percent may be employed to advantage. Usually, however, it is necessary to rely on residual activity. In such cases it is desirable to provide concentrations of about 0.04 percent or higher, preferably in a range of about 0.1 to 5 percent. Even higher concentrations are contemplated, particularly in adverse climatic conditions. In agricultural use application rates of about 10 to 30 pounds of active ingredient per acre would be typically employed.

The following examples will illustrate the invention without necessarily limiting its scope.

EXAMPLE 1

A quantity of 4-(2-diethylaminoethyl)-2-(paramethoxyphenyl)-2H-1,4-benzothiazin-3(4H)-one, hydrochloride is ball-milled until completely pulverized. After ball-milling, it is made into 0.01 and 0.05 percent aqueous suspensions which are employed in the following tests to determine insecticidal activity.

EXAMPLE 2

A disc of filter paper is taped to the bottom half of a Petri dish. Ten flies are placed in the dish, which is then covered with a 16-mesh screen cap. The flies are then sprayed through the screen for 60 seconds with the suspension as prepared in Example 1. After the water evaporates, the flies are transferred to clean cages containing sugar water. Data is recorded 24 hours after the flies are sprayed. In this test the compound 4-(2-diethylaminoethyl) - 2 - (paramethoxyphenyl) - 2H - 1,4 - benzothiazin-3(4H)-one, hydrochloride, was 100 percent effective.

EXAMPLE 3

In this test ten flies are tested by a turntable modification of the Pete-Grady method as described by Lockard et al. (J. Eco. Ent., 46:20–24). Briefly, the flies are tested in small rectangular 16-mesh cages. The tests are run at 30 r.p.m. and the flies are transferred to clean cages after the spraying operation. Data is recorded 24 hours after the flies are sprayed. In this test the compound, 4-(2-diethylaminoethyl) - 2 - (paramethoxyphenyl) - 2H - 1,4 - benzothiazin-3(4H)-one, hydrochloride, was 100 percent effective.

EXAMPLE 4

Leaves of baby limas are dipped in a .05 percent aqueous formulation of 4-(2-diethylaminoethyl)-2-(paramethoxy)-2H-1,4-benzothiazin-3(4H)-one, hydrochloride, described as in Example 1. The petioles are then placed in bottles with water. After the leaves have dried, they are placed in plastic cup units, one leaf to a cup, and ten Mexican bean beetle larvae in early third instar are placed in each cup. Mortality is recorded after 48 hours. In this test 4 - (2 - diethylaminoethyl) - 2 - (paramethoxyphenyl)-2H - 1,4 - benzothiazin-3(4H)-one, hydrochloride provided a mortality rate of 60 to 70 percent against the Mexican bean beetle.

Also contemplated within the scope of this invention are the use of salts of 4-(2-diethylaminoethyl)-2-(paramethoxyphenyl)-2H - 1,4 - benzothiazin-3(4H)-one. Salts coming within the purview of this invention include the acid-addition salts. Acids useful for preparing the acid-addition salts, include, inter alia, inorganic acids, such as the hydrohalic acids (e.g., hydrochloric and hydrobromic acid), sulfuric acid, nitric acid and phosphoric acid, and organic acids, such as oxalic, maleic, tartaric, citric, acetic and succinic acid.

The invention may be variously otherwise embodied within the scope of the appended claims.

What is claimed is:

1. A method for the control of insects comprising applying to said insects an insecticidal amount of 4-(2-diethylaminoethyl) - 2 - (paramethoxyphenyl) - 2H - 1,4-benzothiazin-3(4H)-one or acid-addition salts thereof.

2. The method of claim 1 in which said compound, prior to application, is diluted to a composition containing .005 to 5 percent by weight of said benzothiazine, the balance selected from the group consisting of inert solid carriers and inert liquid carriers.

3. The method as set forth in claim 2 in which the composition contains, in addition, a surface-active agent.

4. A method of claim 1 wherein the 4-(2-diethylaminoethyl) - 2 - (paramethoxyphenyl) - 2H - 1,4-benzothiazin-3(4H)-one, hydrochloride is employed.

References Cited

UNITED STATES PATENTS

| 3,166,554 | 1/1965 | Krapcho | 260—243 |
| 2,989,528 | 6/1961 | Winthrop et al. | 260—243 |
| 3,270,010 | 8/1966 | Faith | 260—243 |

OTHER REFERENCES

Krapcho et al.: Chem. Abs., vol. 58, 1347f, June 1963.

ALBERT T. MEYERS, Primary Examiner

A. J. ROBINSON, Assistant Examiner

U.S. Cl. X.R.

260—243